United States Patent [19]

Cole

[11] 4,298,325

[45] Nov. 3, 1981

[54] DIE FOR THE EXTRUSION OF MATERIAL IN TUBE FORM

[76] Inventor: Robert J. Cole, 224 St. George St., Apt. 501, Toronto, Ontario, Canada, M5R 2N9

[21] Appl. No.: 133,386

[22] Filed: Mar. 24, 1980

[51] Int. Cl.³ .............................................. B29F 3/04
[52] U.S. Cl. ............................. 425/192 R; 425/133.1; 425/381; 425/462; 425/466
[58] Field of Search ............... 425/462, 466, 380, 381, 425/378, 133.1, 192 R

[56] References Cited

U.S. PATENT DOCUMENTS

| | | | |
|---|---|---|---|
| 3,461,501 | 8/1969 | Stewart | 425/381 |
| 3,856,448 | 12/1974 | Iijima et al. | 425/462 |
| 3,860,372 | 1/1975 | Newman, Jr. | 425/133.1 |
| 4,185,954 | 1/1980 | Murakami et al. | 426/462 |

*Primary Examiner*—Jeffery R. Thurlow
*Attorney, Agent, or Firm*—Hirons, Rogers & Scott

[57] ABSTRACT

A die for the extrusion of a tube of plastic polymer consists of at least two coaxially mounted die parts forming one or more annular die gaps between them from which the tube is extruded. The die parts have two respective axial cylindrical surfaces. There is provided between these surfaces an annular member of material of higher coefficient of expansion than the material from which the die parts are made. As the die becomes heated this annular member also becomes heated and its additional expansion causes its outside diameter to expand and its inside diameter to contract into forcible engagement with the surfaces thereby stabilizing the radial gap between the die lips.

7 Claims, 3 Drawing Figures

DIE FOR THE EXTRUSION OF MATERIAL IN TUBE FORM

FIELD OF THE INVENTION

The present invention is concerned with improvements in or relating to dies for the extrusion of material in tube form, and particularly to such dies employed for the extrusion of hot polymer material in the form of a tube.

REVIEW OF THE PRIOR ART

The construction of dies for the extrusion of hot polymer material in tube form is now a well developed art but substantial problems have still been encountered in designing and building dies in which the annular orifice through which the hot material is extruded is of uniform radial dimension throughout its circumference, and is able to maintain the necessary uniformity despite changes in the operating conditions of the die. These problems arise since the die must be assembled from accurately machined component parts, which as a practical matter will be fitted together while at other than their normal operating temperature, when their dimensions are different. Moreover, the die normally is surrounded by heating elements clamped to its exterior, so as to keep the molten polymer at a suitable operating temperature, and the operation of these elements produces a differential expansion of the die parts that will change the effective clearances between them.

It has been found hitherto that, even if the die parts are made with the minimum clearance that will permit the assembly and disassembly of the parts, as the die approaches its operating temperature, these clearances open up allowing radial shifting of one or more of the parts relative to each other, the die orifice will no longer maintain a uniform radial dimension or gap, but instead becomes effectively of oval shape, producing an extruded tube of correspondingly non-uniform thickness around its circumference. The problem of course becomes more pronounced as the diameter of the die increases. Proposals have been made to compensate for this effect by making the orifice adjustable, but this involves substantially greater complexity and expense in the die construction, and cannot correct for variations in distribution within the die produced by the internal radial shifting.

DEFINITION OF THE INVENTION

It is therefore an object of the invention to provide a die of new form for the extrusion of material in tube form.

It is a more specific object to provide a new die in which simple means are provided to assist in the maintenance of the die gap at a uniform value around its circumference.

In accordance with the present invention there is provided a new die for the extrusion of material in tube form comprising:

a first cylindrical die member having a respective first longitudinal axis, having a lip portion thereof providing an inner circular die lip of an annular die orifice concentric with the said axis, and having a first axially-extending cylindrical surface concentric with the said axis;

a second cylindrical die member having a respective second longitudinal axis coaxial with the first longitudinal axis, having a lip portion thereof providing an outer circular die lip of the said annular die orifice, and having a second axially-extending cylindrical surface concentric with the said axes, the said first and second axially-extending cylindrical surfaces being of different diameters and facing in opposite radial directions; and an annular member of a material of a higher coefficient of expansion than that of the first and second cylindrical members, interposed between and engaged with the said first and second axially-extending cylindrical surfaces, so that upon increase in temperature thereof it expands radially to a greater extent than the material of the first and second cylindrical members so as to apply oppositely-directed, radially-acting forces to the said first and second axially-extending cylindrical surfaces to thereby maintian the relative radial positions of the two members and thereby maintian the uniformity of the radial dimension of the annular die gap around its circumference.

Preferably, such a die comprises at least three concentric die members providing a separate orifice between each immediately adjacent pair of die members, and wherein there is provided one of the said annular members of higher coefficient of expansion between each said pair of die members providing an orifice to stabilize the radial dimension of the respective orifice.

DESCRIPTION OF THE DRAWINGS

Dies for the extrusion of molten polymer material that are particular preferred embodiments of the invention will now be described, by way of example, with reference to the accompanying diagrammatic drawings, wherein.

DESCRIPTION OF THE PREFERRED EMBODIMENTS

Figure 1:
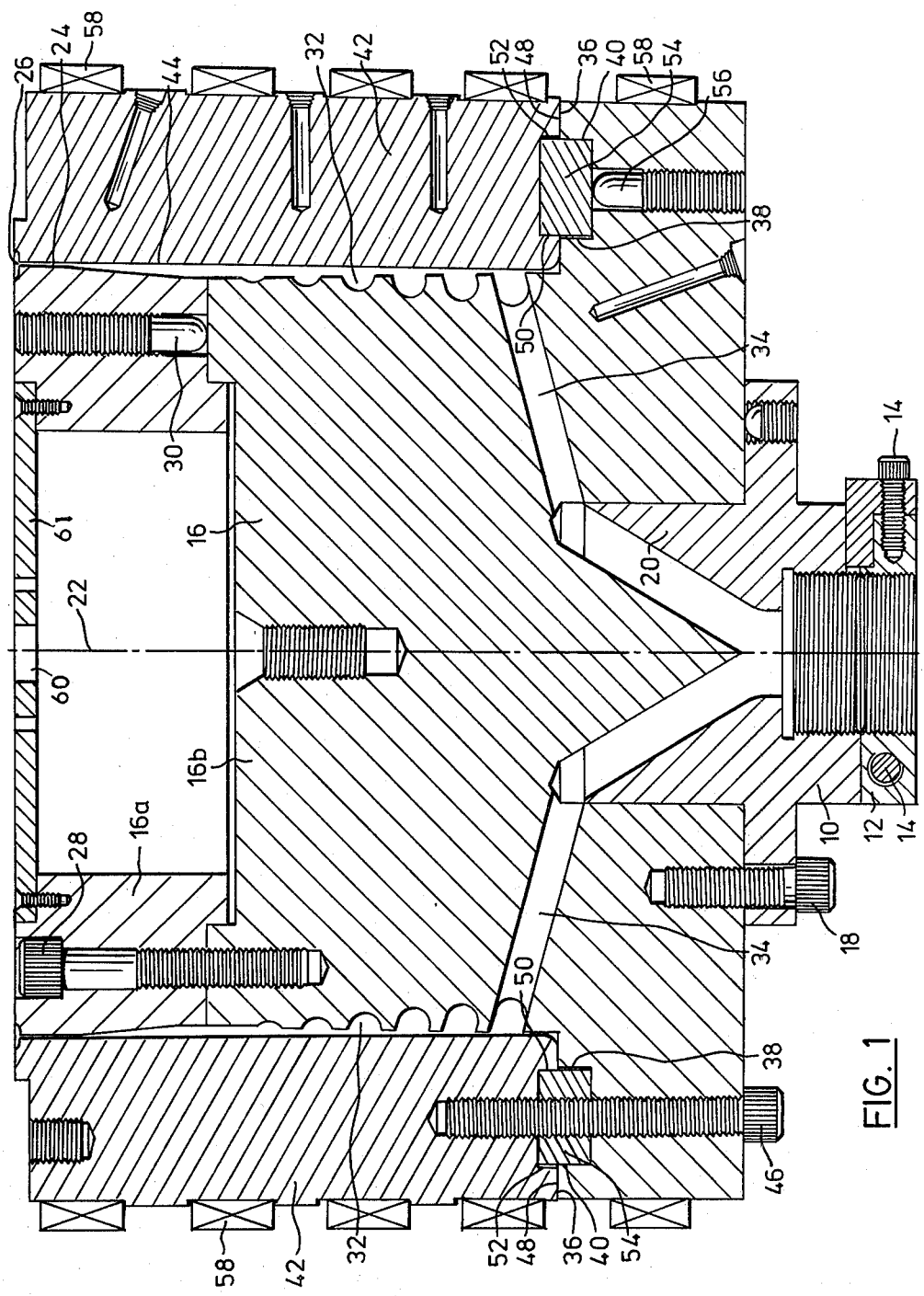
FIG. 1 is a longitudinal cross-section through a die having a single orifice for the extrusion of material in tubular form.

Referring now to FIG. 1 the die illustrated therein is mounted on apparatus from which it is fed with molten polymer material by means of an adapter member 10 to which a locking clamp 12 is secured by bolts 14. A first cylindrical inner die member 16 is fastened to the adapter member 10 by bolts 18 with a spigot 20 of the adapter member engaged in a corresponding recess in the bottom end of the member 16. The inner die member 16 has a longitudinal axis 22 and an upper portion thereof has an outer cylindrical surface 24 coaxial with the axis, this surface constituting the radially inner circular die lip of an annular die orifice 26 coaxial with the said axis. The member 16 is made in two superimposed parts 16a and 16b which are fastened together by axially-extending bolts 28, and are separated when required by jack screws 30. This outer cylindrical surface 24 of the inner member 16 is machined in known manner to a shape such as to provide a plurality of helical grooves 32, into which the molten polymer is fed from cross-holes 34, and which in turn feed the polymer to the die orifice 26.

The inner member 16 is of what may be called approximately inverted T cross-section, so as to provide a flat annular surface 36 perpendicular to the axis 22. This surface is provided with an annular recess having a radially-inner cylindrical surface 38 and a radially outer cylindrical surface 40 both of which are coaxial with the axis 22.

A second annular outer die member 42 having an inner cylindrical surface 44 fits around the inner member 16 and is fastened thereto by circumferentially-spaced axial bolts 46. The lower portion of the surface 44 (as seen in FIG. 1) is a close fit against the corresponding portion of surface 24 with the minimum clearance that will permit assembly and disassembly, this surface 44 being coaxial with the axis 22 and at its other end constituting the radially outer circular die lip of the annular die orifice 26. The lower end of the member 42 is formed with an annular surface 48 parallel to and abutting the annular surface 36, this annular surface also being provided with an annular recess having cylindrical parallel surfaces 50 and 52 coaxial with the axis 22. The two annular recesses register with one another and form an annular enclosure that receives a ring 54 of size to permit its insertion into both recesses with minimum clearances between its radially inner and outer cylindrical surfaces and the cylindrical surfaces 40 and 50 of parts 16 and 42 respectively.

It will be noted that the bolts 46 pass through the ring 54 so as not to increase the width unduly at this point. The die parts are separated for disassembly by operation of a plurality of screw-threaded circumferentially-spaced jacking screws 56. The die provided in known manner with heating units 58 wrapped around its exterior, while pressurised air for expanding the tubular bubble produced by the die is fed to its interior via a bore 60 in a cover plate 61. The die is provided with other bores, passages, etc. required for its proper operation which are not part of the present invention and need not be referred to further.

Figure 3:
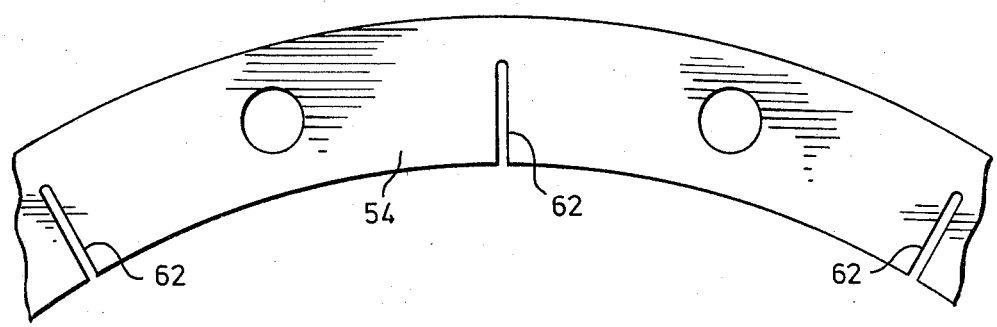
FIG. 3 is an end elevation of part of an annular member of the invention.

The ring 54 is of a material that has substantially greater coefficient of expansion than that of the material from which the die parts 16 and 42 are made, and it will therefore increase in its dimensions to a greater extent than the adjacent die parts as the die becomes heated in operation. Moreover, as will be seen from FIG. 3 the ring is provided with radial slots 62 extending from its radially inner edge, so that its radially inner circumference is able to move radially inwards as it expands. In a typical operation the bands 58 heat the outer surface of die part 42 to a temperature of about 315° C. (600° F.) while the polymer flowing through the die has a temperature of about 200° C. (400° F.). There is therefore a temperature gradient increasing radially outwards through the die which will itself cause differential expansion of the die parts. It has been found with prior art dies that even if the designer aims for zero clearance between the contacting surfaces of parts 16 and 42 when unheated, which will cause substantial difficulties in assembly and disassembly, at the elevated temperature of operation there is sufficient differential expansion for a clearance to appear and for the outer die part to no longer register accurately with the inner die part, so that a uniform die gap is difficult to maintain.

In a die of the invention the dimensions of the ring 54 increase to a much greater extent than the relative dimensions of the die parts, and it is forced into intimate contact with the radially-oppositely facing surfaces 40 and 50 of the die parts, the oppositely-directed, radially-acting forces that are thus produced and applied to these oppositely-facing surfaces thereby maintaining the parts concentric and not allowing any changes in clearances due to relative radial movement between the die parts. The axially-extending surface 40 of the inner die member 16 is of larger diameter than the corresponding surface 50 of the outer die member 42, so that these forces urge the outer die member radially inwards relative to the inner die member. The gap between the surfaces 24 and 44 will be stabilised along its entire length, stabilising also the annular die gap 26. A suitable material for the ring 58 is for example a high tensile stainless steel.

Figure 2:
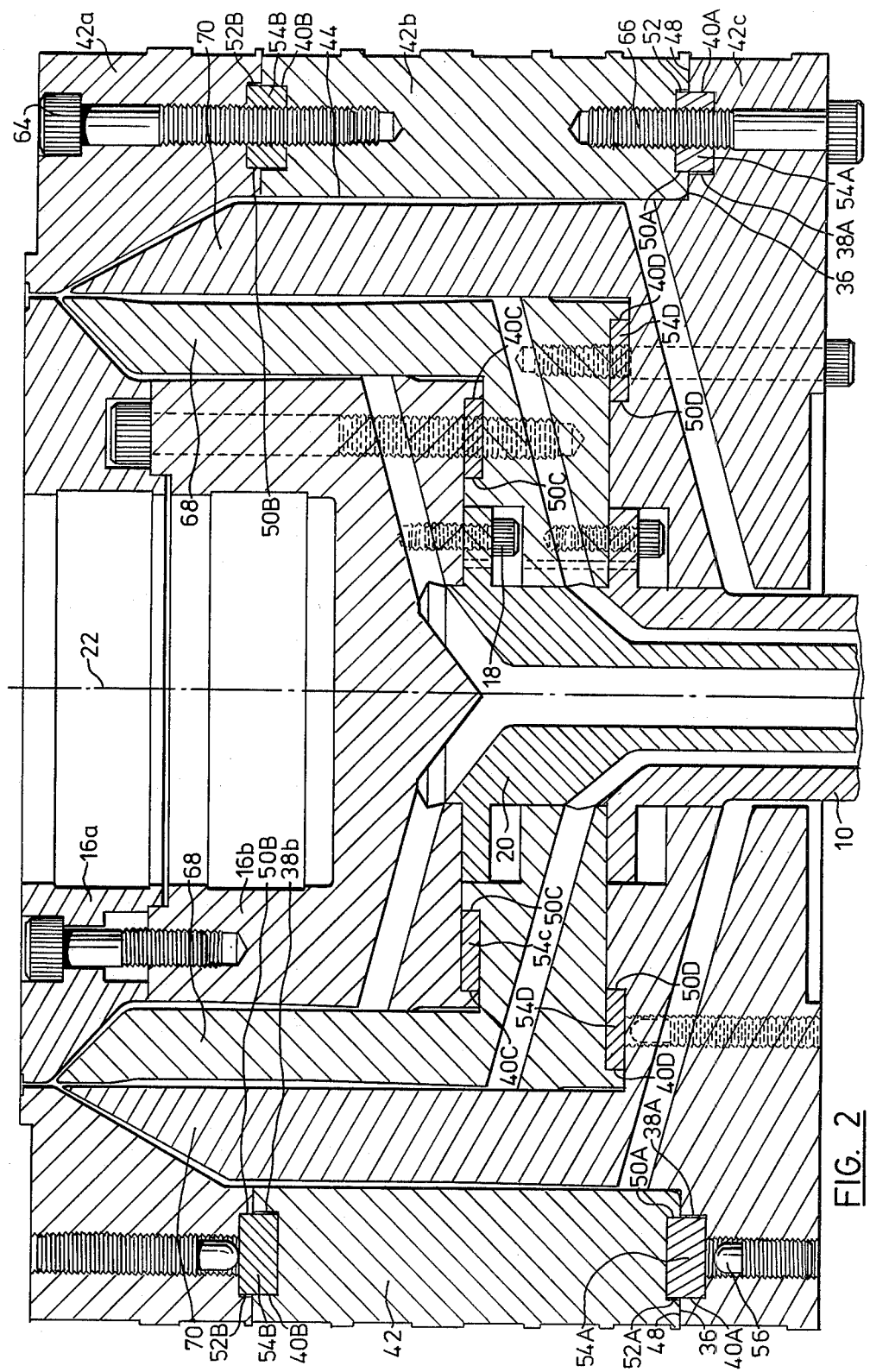
FIG. 2 is a similar cross-section through a die having a multiple orifice.

FIG. 2 shows the application of the invention to a multiple orifice die, in which otherwise extreme difficulty is found in maintaining the clearances between the different die parts at stable values. Similar parts are given the same reference number as with the embodiment of FIG. 1. In this particular embodiment three separate circular orifices meet within the die so that the molten polymer emerges from a common die orifice and the external die part 42 is made in three separate parts 42a, 42b and 42c held together by axial bolts 64 and 66. The die permits three coaxial streams of polymer to be extruded simultaneously and two additional die parts 68 and 70 are interposed between the parts 16 and 42 to provide the necessary flow paths. This die requires the use of four annular rings which are given the respective references 54A, 54B, 54C and 54D, which are operative between respective pairs of radially-oppositely facing surfaces 40A, 50A; 40B, 50B; 40C, 50C and 40D, 50D.

Although the member 54 has so far been described and illustrated as a unitary ring it will be apparent that it could also comprise a plurality of separate arcuate segments, provided these extend over a sufficient angular amount of a circle to produce the required effect.

I claim:

1. A die for the extrusion of material in tube form comprising:
   a first cylindrical die member having a respective first longitudinal axis, having a lip portion thereof providing an inner circular die lip of an annular die orifice concentric with the said axis and having a first axially-extending cylindrical surface concentric with the said axis;
   a second cylindrical die member having a respective second longitudinal axis coaxial with the first longitudinal axis, having a lip portion thereof providing an outer circular die lip of the said annular die orifice, and having a second axially-extending cylindrical surface concentric with the said axis, the said first and second axially-extending cylindrical surfaces being of different diameter and facing in opposite radial directions; and
   an annular member of a material of a higher coefficient of expansion than that of the first and second cylindrical members, interposed between and engaged with the said first and second axially-extending cylindrical surfaces, so that upon increase in temperature thereof it expands radially to a greater extent than the material of the first and second cylindrical members so as to apply oppositely-directed, radially-acting forces to the said first and second axially-extending cylindrical surfaces to thereby maintain the relative radial positions of the two members and maintain the uniformity of the radial dimension of the annular die gap around its circumference.

2. A die as claimed in claim 1, wherein the said annular member is of rectangular radial cross-section.

3. A die as claimed in claim 1, wherein the said annular member is a ring provided with radial slots extending radially outward from its radially inner cylindrical surface to permit radially inward movement of the said radially inner surface.

4. A die as claimed in claim 1, wherein axially-extending circumferentially-spaced bolts holding together the two parts of the die pass through the said annular member.

5. A die as claimed in claim 1, wherein the said first axially-extending cylindrical surface is of larger diameter than the said second axially-extending cylindrical surface, so that the radial expansion of the annular member urges the second cylindrical member and its outer circular die lip radially inward relative to the first cylindrical member and its inner circular die lip.

6. A die as claimed in claim 1, and comprising a third cylindrical die member having a respective third longitudinal axis and disposed between the said first and second die members with all three axes coaxial, the third die member having a lip portion thereof providing an outer circular die lip of a respective annular die orifice formed between itself and the first cylindrical die member, the said lip portion also providing an inner circular die lip of a respective annular die orifice formed between itself and the second cylindrical die member, the third die member also having a second axially-extending cylindrical surface of different diameter to and facing in the opposite radial direction to the said first axially-extending cylindrical surface of the first die member, and having a first axially-extending cylindrical surface of different diameter to and facing in the opposite radial direction to the said second axially-extending cylindrical surface of the second cylindrical die member, the first-mentioned annular member being interposed between and engaged with the first and second axially-extending cylindrical surfaces respectively of the first and third die members, and comprising a second annular member of a material of a higher coefficient of expansion than that of the second and third die members, interposed between and engaged with the first and second axially-extending cylindrical surfaces respectively of the second and third die members so as to apply oppositely-directed, radially-acting forces to the respective first and second axially extending surfaces to thereby maintain the relative radial positions of the two members and maintain the uniformity of the radial dimensions of the respective annular die gaps around its circumference.

7. A die as claimed in claim 6 and comprising a fourth cylindrical die member having a respective fourth longitudinal axis and disposed between the said third and second die member with all four axes coaxial, the fourth die member having a lip portion thereof providing an outer circular die lip of a respective annular die orifice formed between itself and the third cylindrical die member, the said lip portion also providing an inner circular die lip of a respective annular die orifice found between itself and the second cylindrical die member, the fourth die member also having a second axially-extending cylindrical surface of different diameter to and facing in the opposite radial direction to the said first axially-extending cylindrical surface of the second die member, and having a first axially-extending cylindrical surface of different diameter to and facing in the opposite radial direction to a second axially-extending cylindrical surface of the third die member, and comprising a third annular member of a material of a higher coefficient of expansion than that of the second and fourth die members interposed between and engaged with the first and second axially-extending cylindrical surfaces respectively of the second and fourth members so as to apply oppositely-directed, radially-acting forces to the respective first and second axially extending surfaces to thereby maintain the relative radial positions of the two members and maintain the uniformity of the radial dimensions of the respective annular die gaps around its circumference.

* * * * *